Dec. 11, 1951 B. D. LOUGHLIN 2,577,781

WAVE SIGNAL RECEIVER

Filed March 19, 1946 3 Sheets-Sheet 1

*INVENTOR:*
BERNARD D. LOUGHLIN,

*BY* Harry C. Page

ATTORNEY.

*INVENTOR:*
BERNARD D. LOUGHLIN,
*BY* Harry C. Page
ATTORNEY.

Dec. 11, 1951 B. D. LOUGHLIN 2,577,781

WAVE SIGNAL RECEIVER

Filed March 19, 1946 3 Sheets-Sheet 3

*INVENTOR.*
BERNARD D. LOUGHLIN,
*BY* Harry C. Page
ATTORNEY

UNITED STATES PATENT OFFICE 2,577,781

WAVE-SIGNAL RECEIVER

Bernard D. Loughlin, Bayside, N. Y., assignor, by mesne assignments, to Hazeltine Research, Inc., Chicago, Ill., a corporation of Illinois Application March 19, 1946, Serial No. 655,458

15 Claims. (Cl. 250—20)

Figure 1:
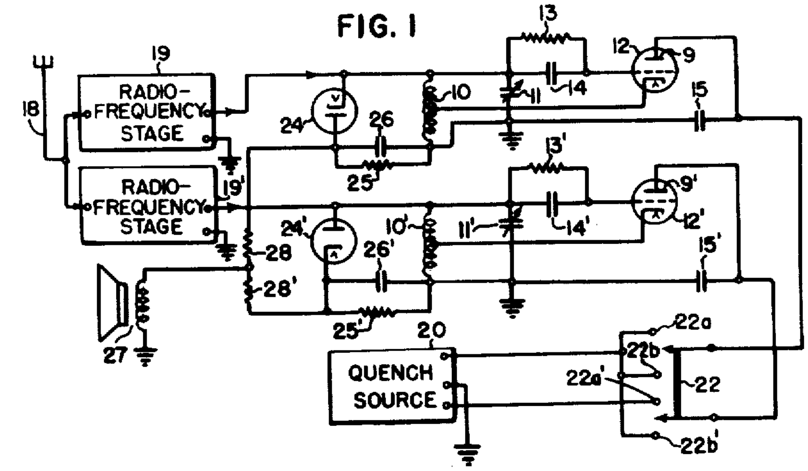

This invention relates to receivers for receiving angular-velocity-modulated wave signals and, while the receivers of the invention are of general utility in receiving such signals, they are of particular utility in receiving wave signals which are frequency-modulated by audio-signal components to provide carrier-frequency deviations which are large with reference to the frequency of the audio-signal components.

The present application is a continuation-in-part of application Serial No. 520,615, filed February 1, 1944, now abandoned, entitled "Wave-Signal Receiver," and assigned to the same assignee as the present application.

In receiving and reproducing wave signals which have been angular-velocity-modulated, such as frequency-modulated wave signals, it is generally desirable to provide some means in the receiver for reducing the effect of amplitude variations, such as produced by certain noise components in the received wave signal. Such means are usually necessary for the reason that frequency-modulated signals are conventionally converted to amplitude-modulated signals during reception and reproduction, the amplitude-modulated signals being thereafter detected in an amplitude-responsive detector. Thus, if some means is not provided for reducing amplitude-modulated noise signals, these noise signals appear in such systems as amplified noise components in the reproduced signal output of the receiver. Limiting devices and balanced-frequency detectors are, therefore, conventionally provided in prior signal receivers for the purpose of reducing the effect of amplitude variations in the received wave signal, so that the demodulated signal consists principally of the angular-velocity-modulation components of the received wave signal.

It is also well known that a conventional superregenerative receiver, when used to detect an amplitude-modulated wave signal, is selective against noise pulses of high amplitude and short duration. Such prior superregenerative receivers, however, are inherently incapable of receiving and accurately reproducing a frequency-modulated signal for the reason that the principle upon which such receivers operate is to produce a constant-frequency signal, the amplitude of which varies in accordance with the amplitude of the received signal input to the receiver. Thus, frequency-modulated signals can only be demodulated by detuning such a receiver so the signal is received on one side of the selective curve, producing a distorted output signal. It is highly desirable, however, to provide a frequency-modulation receiver having this highly desirable characteristic of discrimination against large-amplitude short-duration noise signals of the conventional superregenerative receiver, which at the same time provides linear demodulation of a frequency-modulated signal.

It is furthermore well known that a conventional superregenerative receiver for receiving high-frequency signals provides a simple means of obtaining a very large amount of radio-frequency amplification at frequencies which are very difficult to amplify by ordinary methods. Therefore, it is highly desirable to provide a low-distortion frequency-modulation receiver having this very beneficial characteristic of the superregenerative receiver. Furthermore, the carrier frequencies utilized for frequency-modulation transmission are relatively high and it is highly desirable to minimize the number of tunable circuits required in a tunable high-frequency receiver. The reason for this is that the tracking of tunable circuits becomes increasingly difficult at high frequencies. A conventional tunable superregenerative receiver is generally provided with a single, tunable circuit or at least a very small number of tunable circuits. It is, therefore, also highly desirable to provide a tunable low-distortion frequency-modulation receiver having such a characteristic.

It is an object of the invention, therefore, to provide an improved receiver for receiving an angular-velocity-modulated wave signal.

It is another object of the invention to provide an angular-velocity-modulated wave-signal receiver which is not subject to one or more of the above-mentioned limitations of the prior art wave-signal receivers.

It is still another object of the invention to provide a low-distortion superregenerative receiver for receiving angular-velocity-modulated wave signals.

It is yet another object of the invention to provide an angular-velocity-modulation wave-signal receiver which is substantially unresponsive to undesirable amplitude modulation which may accompany a received angular-velocity-modulated wave signal.

An additional object of the invention is to provide an angular-velocity-modulation wave-signal receiver which takes advantage of the exceptionally high gain on wave-signal amplifications provided by superregenerative circuits yet one in which such circuits have a selectivity characteristic substantially improved in comparison with that hereto attainable in practice.

It is still another object of the invention to provide a tunable receiver for receiving angular-velocity-modulated wave signals in which the number of tunable circuits is reduced to a minimum.

In accordance with a particular form of the invention, a wave-signal receiver for receiving an angular-velocity-modulated wave signal having modulation components in a pre-determined frequency range comprises a tuned circuit, a regenerative circuit including the tuned circuit and having a superregenerative frequency-response characteristic which increases with frequency deviations in a given direction from a predetermined frequency in the range, a regenerative circuit also including the aforementioned tuned circuit and having a superregenerative frequency-response characteristic which increases with frequency deviations in the opposite direction from the aforesaid predetermined frequency in the range, and means for exciting the above-mentioned tuned circuit with the received wave signal. Means are also provided for quenching the regenerative circuits at substantially the same frequency, one during alternate operating periods and the other during the intervening operating periods which periods have substantially equal durations, thereby to provide superregeneration. The receiver also includes a pair of modulation-signal detectors individually coupled to said tuned circuit, means for controlling said detectors alternately and in synchronism with the aforesaid operating periods to detect signal outputs from said regenerative circuits which are developed in the aforesaid tuned circuit, and means for combining the detected signal outputs to develop the modulation components of the received wave signal.

For a better understanding of the present invention, together with other and further objects thereof, reference is had to the following description taken in connection with the accompanying drawings, and its scope will be pointed out in the appended claims.

Figure 2C:
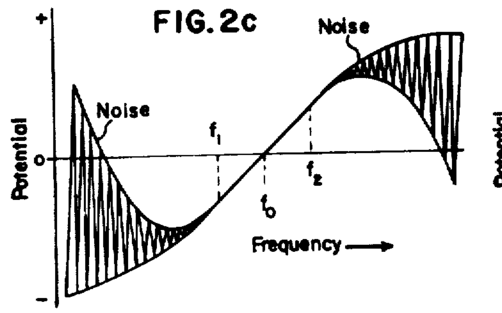
Figure 2D:
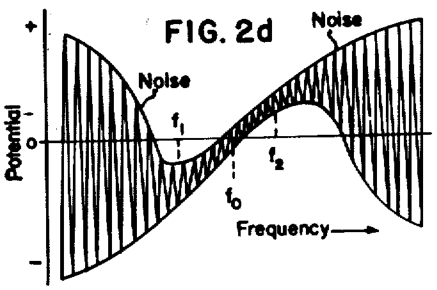
Figure 5:
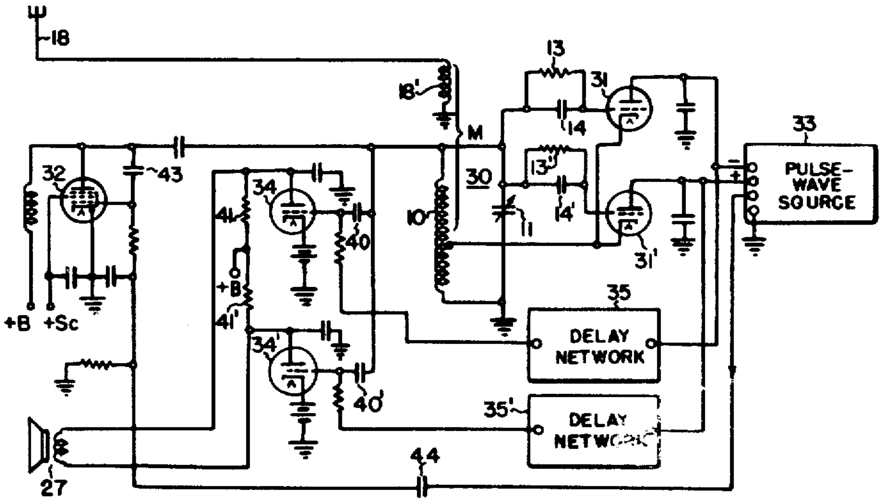
Figure 6:
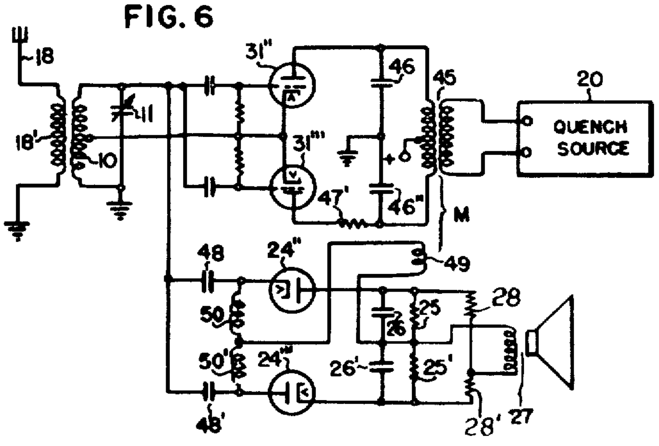

Fig. 1 of the drawings is a circuit diagram, partly schematic, of a complete superregenerative frequency-modulation wave-signal receiver in accordance with the invention; Figs. 2, 2*a*, 2*b*, 2*c* and 2*d* comprise graphs utilized in explaining the operation of the receiver of Fig. 1; Fig. 3 is a schematic circuit diagram of a low-distortion frequency-modulation superregenerative circuit utilizing a single tuned circuit; Fig. 4 comprises graphs utilized in explaining the operaton of the receiver of Fig. 3 when operated in the linear mode; Fig. 5 is a circuit diagram, partly schematic, of a receiver generally similar to that of Fig. 3; while Fig. 6 is a circuit diagram, partly schematic, of a modified superregenerative frequency-modulation receiver in accordance with the invention.

Fig. 1 of the drawings represents a wave-signal receiver for receiving an angular-velocity-modulated signal having modulation components in a predetermined frequency range. This receiver comprises a first regenerative circuit having a superregenerative frequency-response characteristic which increases with frequency deviations in a given direction from a predetermined frequency in the above-mentioned predetermined frequency range. The characteristic last mentioned is discussed more fully hereinafter. This regenerative circuit includes a tuned circuit comprising inductance 10 and capacitance 11 connected in parallel. In order to provide the regenerative features mentioned for the tuned circuit 10, 11, there is provided a vacuum tube 12 coupled thereto by a circuit of the Hartley oscillator type. Specifically, one side of tuned circuit 10, 11 is grounded and the other side of the tuned circuit is coupled to the input electrode of tube 12 through a resistor 13, which is bypassed for radio-frequency currents by a condenser 14, and the cathode of tube 12 is connected to a tap on inductance 10. Anode voltage is provided for tube 12 in a manner which will be described more fully hereinafter.

The receiver of Fig. 1 also comprises a second regenerative circuit having a superregenerative frequency-response characteristic which increases with frequency deviations in the opposite direction from the above-mentioned predetermined frequency in the operating range. This last-named regenerative circuit also comprises a parallel-resonant circuit connected in a Hartley type oscillator and elements thereof which are similar to those of the first regenerative circuit have identical numerals primed.

The receiver also somprises means for exciting the regenerative circuits including resonant circuits 10, 11 and 10′, 11′ with a received wave signal. This last-named means includes an antenna 18 coupled to tuned circuit 10, 11 through a radio-frequency amplifier stage 19 and to resonant circuit 10′, 11′ through a radio-frequency amplifier stage 19′.

In order to provide superregeneration in the circuit of Fig. 1, means are provided for quenching the tuned circuits 10, 11 and 10′, 11′ at substantially the same frequency. This last-named means comprises a quench source 20 adapted to be coupled through the contacts 22*a*, 22*a*′ of a double-pole double-throw switch 22 to the anodes 9, 9′ of the respective tubes 12 and 12′ with opposite polarity and adapted to be coupled to the anodes 9, 9′ of tubes 12 and 12′, through the contacts 22*b*, 22*b*′ of switch 22, with the same polarity.

The receiver of Fig. 1 further comprises means for combining signal outputs from tuned circuits 10, 11 and 10′, 11′ to develop the modulation components of the received wave signal. Specifically, a diode 24 is coupled across tuned circuit 10, 11 through a load resistor 25, which is bypassed for radio-frequency currents by a condenser 26, and a similar diode rectifier 24′, comprising load resistor 25′ and condenser 26′, is provided for tuned circuit 10′, 11′, diode 24′ being oppositely poled with respect to diode 24. The voltages developed across load resistors 25 and 25′ are of opposite polarity and are combined through resistors 28 and 28′, and applied to loudspeaker 27 for reproduction. Resonant circuit 10, 11 is tuned to a lower frequency than resonant circuit 10′, 11′.

In considering the operation of the circuit of Fig. 1, it will first be assumed that switch 22 is operated to close its contacts 22*b*, 22*b*′ and, under this condition, it will be seen that the channel including units 19, 10, 11, 12 and 24 comprise a superregenerative receiver of conventional type. In operation, the regenerative circuit 10, 11, 12 is periodically quenched by the voltage applied to the anode of tube 12 from source 20 and the modulation components of signals received by antenna 18 are produced across load resistor 25. The superregenerative frequency-response characteristic of this channel has the general shape of the frequency-response characteristic of tuned circuit 10, 11 except that the band width is less and the sides are steeper. This is illustrated in Fig. 2 by the curve A, assuming that resonant circuit 10, 11 is tuned to the frequency $f_1$. Similarly, the channel including units 19', 10', 11', 12' and 24' operates as a superregenerative receiver and, assuming that resonant circuit 10', 11' is tuned to the frequency $f_2$, this last-named channel may have a superregenerative frequency-response characteristic, as illustrated by curve B of Fig. 2. Thus, each of the two channels operates as a superregenerative receiver, and due to the fact that the circuits are simultaneously quenched, the operation of the two channels may be considered to be substantially independent. Since the signal outputs of the channels are supplied to the loudspeaker 27 with opposite polarities, the frequency-response characteristic at the loudspeaker is represented by the curve C. It will be seen that the curve C is the familiar S curve of a low-distortion frequency discriminator and that the receiver of Fig. 1 therefore is suitable for receiving and reproducing an angular-velocity-modulated signal having modulation side bands within the frequency range $f_1$, $f_2$. The frequency of quench source 20 is preferably low with reference to the carrier component of signals intercepted by antenna 18 and high with reference to the frequency of the highest modulation component of the intercepted signal.

In considering the operation when switch 22 is operated to close its contacts 22a, 22a', it will be seen that under this condition the signal output from the source 20 is applied to the tubes 12 and 12' with opposite polarity. Therefore, in the receiver operation, circuits 10, 11 and 10', 11' are alternately quenched, the operation otherwise being substantially as described above. Due to the fact that the quench frequency is high with reference to the highest of the modulation components of the received wave signal, the components detected in diode 24, during the period its receiving channel is sensitive, correspond substantially in phase with those detected in diode 24' during the following period when its receiving channel is sensitive. Therefore, these signal outputs can be combined with opposite polarity without any detrimental results. Another way of viewing this operation is to consider that the time constants of the load circuits of diodes 24 and 24', being long with reference to the period of the quench-frequency source, effectively provide average values of the detected signal.

However, while it has been shown that circuits 12 and 12' can be quenched either simultaneously or alternately, it is generally undesirable to quench these circuits other than substantially synchronously or with a phase displacement of substantially 180 degrees. The reason for this is that it is undesirable for one of the channels to be made sensitive while a high transient voltage is being built up in the other channel inasmuch as cross coupling between the channels would produce appreciable difficulties.

As is well known, such superregenerative detectors may have a "linear" or "logarithmic" mode of operation depending upon the amplitude, wave form, frequency, or any two or more of these characteristics, of the quench voltage generated by the source 20.

A "linear" mode of operation is effected when the characteristics of the quench voltage are so selected that the oscillations developed in the resonant circuits 10, 11 and 10', 11' are not allowed to build up to an equilibrium or maximum-amplitude oscillation value before being quenched. This mode of operation is called "linear" for the reason that the peak-rectified output voltage of either of the detectors 24 and 24' is directly proportional to the amplitude of the wave signal applied to the regenerative circuits. In this mode of operation, the amplitude of the derived modulation components varies almost proportionately with the intensity of the applied wave signal. The applied wave signal may have undesirable amplitude variations, such as those caused by atmospheric fading or transient atmospheric and local electrical disturbances. If such amplitude variations occur during moments when an applied frequency-modulated wave signal has deviated to one side of its mean frequency and during the sensitive periods of the regenerative circuits, they are derived in the output circuit of the detector unless removed by a limiter stage included in the receiver at a point preceding the detector. Such limiter stage may be included in units 19 and 19' of the Fig. 1 arrangement. For the linear mode of operation, the wave form of the conductance characteristic of the superregenerative circuits may be rectangular and the frequency-selectivity characteristic of each superregenerative circuit itself is then that of two loosely coupled tandem-arranged tuned circuits. It has been found that, in this mode of operation, deviations of the received wave-signal frequency beyond the frequency limits $f_1$–$f_2$, Fig. 2, cause distortion of the derived modulation components. Distortionless reproduction thus requires that the receiver be so tuned that the mean frequency of the frequency-modulated wave signal applied to the superregenerative detector systems has a frequency very nearly the value $f_0$, Fig. 2.

The operation of the superregenerative detector systems in the logarithmic mode is somewhat different than is the case with the linear mode of operation and leads to operating characteristics so unique as to merit more detailed analysis. "Logarithmic" mode of operation is effected when the characteristics above-mentioned of the quench voltage of source 20 permit the oscillations developed across the tuned circuits 10, 11 and 10', 11' to build up to an equilibrium or constant amplitude before being quenched. This mode of operation is called "logarithmic" for the reason that the average-rectified output voltage of each of the detectors 24 and 24' varies logarithmically with the intensity of the applied wave signal.

Figure 2A:
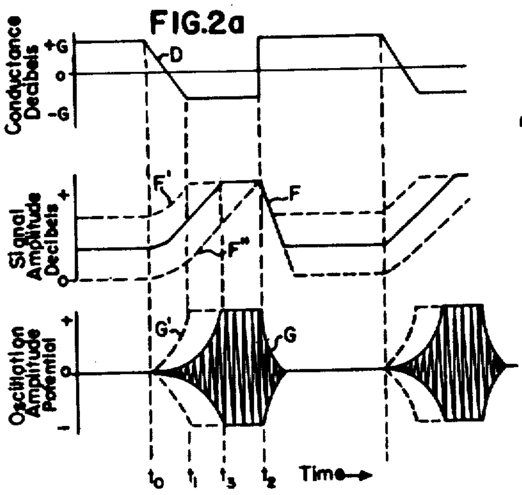
Figure 2:
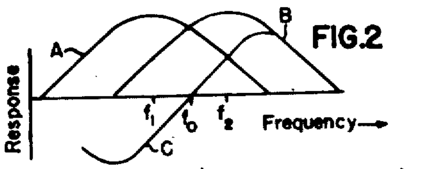
Figures 3, 4:
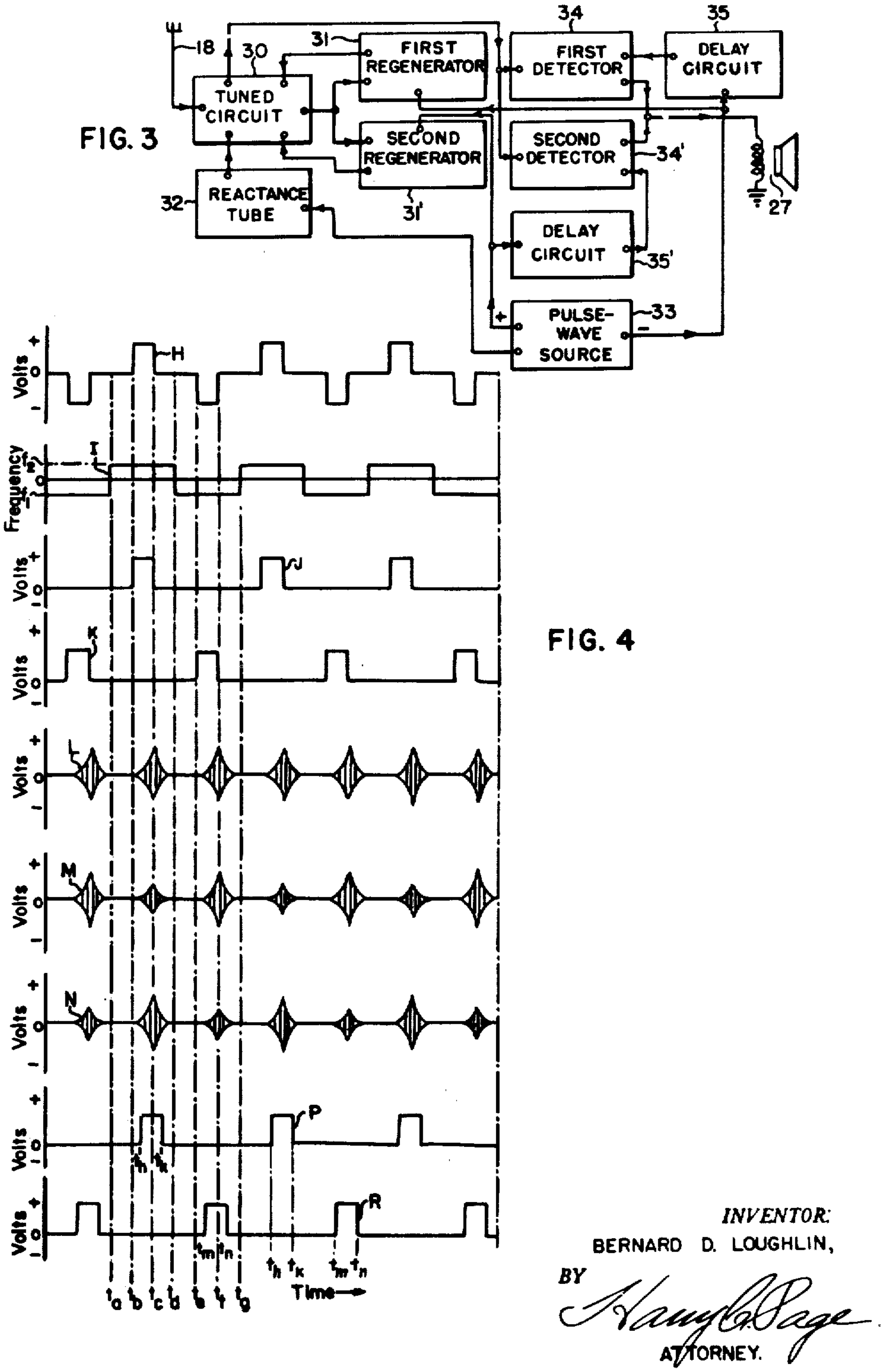

Typical operating characteristics of a superregenerative detector operating in the logarithmic mode are represented graphically by the curves of Fig. 2a. It is to be understood that these operating characteristics represent specific although preferred operating conditions of the detector and are given by way of example. Thus, for reasons presently to be pointed out, the detector preferably has a conductance characteristic of trapezoidal configuration as represented by curve D of Fig. 2a. The portion of this conductance characteristic during the interval $t_0$–$t_1$ of each quench cycle is preferably linear, as indicated, and its slope or rate of change with time determines the frequency-response characteristic of the detector. As earlier mentioned, this characteristic has somewhat steeper sides than does the simple band-pass characteristic of either of the tuned circuits 10, 11 or 10', 11'. In addition, the maximum response of the superregenerative detector may occur at a frequency slightly different from the resonant frequency of its tuned circuit. This "dynamic" frequency-response characteristic of the superregenerative detector is referred to in the specification and claims as its "superregenerative frequency-response" characteristic and may be defined as its input-output amplitude characteristic with varying wave-signal frequency but with a constant value of output signal from the detector. The superregenerative frequency-response characteristic becomes sharper with decreasing slope of the conductance characteristic during the interval $t_0$–$t_1$. If the slope is sufficiently small, the superregenerative frequency-response characteristic of the detector varies approximately in accordance with a probability function over a relatively wide frequency range centered about the frequency of maximum response of the characteristic. Such a characteristic is equivalent to the frequency selectivity provided by a very large number of tandem-arranged, mutually uncoupled tuned circuits and is consequently very much sharper than that of conventional superregenerative detectors heretofore used.

The constant-amplitude portion of the conductance characteristic, occurring during the interval $t_1$–$t_2$, establishes the interval during each quench cycle when the superregenerators can establish a logarithmic mode of operation characterized by a constant logarithmic coefficient. The importance of this constant-amplitude portion of the conductance characteristic will be more evident from a consideration of curves F, F' and F'' of Fig. 2*a*, which represent the manner in which the amplitude of the oscillations developed in one of the resonant circuits 10, 11 or 10', 11' builds up and decays for each one of three applied wave signals, each having a selected value of amplitude. It will be noted that these amplitude values are plotted to a logarithmic amplitude scale. Curve F represents the condition for an applied wave signal of moderate amplitude, curve F' that for an applied signal of larger amplitude, and curve F'' that for a wave signal having a relatively low amplitude comparable to the noise level. It will be noted that the maximum amplitude of the developed oscillations resulting from each of these three amplitude values reaches a constant value (commonly called "saturation") during the interval $t_1$–$t_2$ so that the range of applied signal amplitudes which produce saturation during this interval represents the largest range for which the detector has a logarithmic mode of operation characterized by the same logarithmic coefficient. An applied wave signal of larger amplitude would cause the detector to operate in a logarithmic mode having a different logarithmic coefficient. This is because the oscillations developed across the tuned circuit of the detector would then reach large amplitude before the conductance characteristic, represented by curve D, had attained a constant value.

The variation of amplitude of the oscillations developed in the resonant circuits 10, 11 or 10', 11', when plotted to a linear amplitude scale, is represented by curve G for an applied wave signal of moderate amplitude corresponding to curve F and is represented by curve G' for an applied wave signal of larger amplitude corresponding to that of curve F'.

It might be thought from what has just been said that logarithmic operation characterized by a constant logarithmic coefficient could be obtained over the largest possible range of amplitudes of an applied wave signal by causing the conductance characteristic to change substantially instantaneously from its maximum positive value to its maximum negative value. While this is true, it is inconsistent with the requirement that the superregenerative frequency-response characteristic of the resonant circuits 10, 11 and 10', 11' should preferably be that corresponding to a probability function, for reasons presently to be pointed out in greater detail in connection with the linearity of the detector characteristic. As earlier mentioned, such probability-shaped characteristic requires a linear and relatively slow change of the conductance characteristic from its maximum positive value to its maximum negative value, the slower such change occurs the more nearly the desired probability-shaped characteristic is attained over the entire pass-band of the tuned circuit. It is thus necessary to comprise between the extent to which the probability-shaped characteristic of the resonant circuits 10, 11 and 10', 11' is attained over the entire pass-band of each tuned circuit and the range of wave-signal amplitudes which can be handled by the detectors when operating with logarithmic operation characterized by a constant logarithmic coefficient. Such compromise may readily be effected in practice by suitable selection of the wave form and amplitude of the quench voltage of source 20.

It is the purpose of the following mathematical analysis of the wave signal detector system to indicate the conditions which should preferably be fulfilled in order that the detector shall be unresponsive to undesired amplitude variations of a received angular-velocity-modulated wave signal and in order that the input-output characteristic of the detector shall be linear with frequency deviations of the applied wave signal. In performing this analysis, the operation of only one of the superregenerative detectors will be first considered, after which the combined operation of both detectors will be treated. Considering first the operation of the superregenerative detector which includes the tube 12, it can be shown that if the maximum amplitude of the oscillations developed across the tuned circuit 10, 11 reaches a constant value during the interval $t_1$–$t_2$, Fig. 2*a*, the logarithmic mode of operation prevails and is defined mathematically by the following relation:

$$E_0 = E_0' K \frac{C}{G} \log_e \left( \frac{E'}{E_{ref}} \right) \qquad (1)$$

where $E_0$=the amplitude of the unidirectional potential derived across the load impedance 25, 26, when a wave signal of amplitude E' exists in the tuned circuit of the regenerator at time $t_1$.

$E_0'$=the amplitude of the unidirectional potential derived across the load impedance 25, 26 when a wave signal of amplitude $E_{ref}$ exists at time $t_1$.

K=an arbitrary constant.

C=the capacitance of the condenser 11.

G=the effective value of the negative conductance in the tuned circuit 10, 11 at the moment the final logarithmic mode of operation is established, such as at the time $t_3$.

It will be noted that the signal amplitude E' is defined at time $t_1$ which will cause it to differ from the amplitude of the applied wave signal by virtue of a regenerative action occurring at the regenerative circuit during the interval $t_0$–$t_1$. The value of the conductance G may vary with the intensity of an applied wave signal, but is preferably made to be constant (by suitable selection of the quench-voltage wave form and amplitude) over the range of amplitudes of the applied wave signal normally to be encountered in practice.

Since during the interval $t_0$–$t_1$, the regenerative action effects an amplification of the applied wave signal and also determines the superregenerative frequency-response characteristic of the detector, the equation relating the signal voltage at time $t_1$ to the voltage at time $t_0$ and including the effect of variations of the frequency of the applied wave signal with relation to the resonant frequency of the tuned circuit 10, 11 may be expressed as follows:

$$E'=EF(f) \qquad (2)$$

where

E=the wave-signal voltage existing across the tuned circuit 10, 11 at time $t_0$, this voltage being equal to the wave-signal voltage applied to the detector.

$F(f)$=the frequency-gain function relating the voltage E′ to the wave-signal voltage E as determined by the regenerated resonant circuit.

When the conductance characteristic varies linearly during the interval $t_0$–$t_1$ as shown in Fig. 2a, and this variation is sufficiently slow, it can be shown that the frequency-gain function of Equation 2 may be expressed by the relation:

$$F(f)=Y\epsilon^{-x^2} \qquad (3)$$

where

Y=the regenerative gain during the interval $t_0$–$t_1$ (and previously mentioned in defining the voltage E′) when the frequency of the applied wave signal is equal to the resonant frequency of the tuned circuit 10, 11.

$x$=the instantaneous frequency spacing between the applied wave-signal frequency and the resonant frequency of the tuned circuit 10, 11.

Substituting Equations 2 and 3 into Equation 1, the output voltage of the detector is given by the relation:

$$E_0=E_0'K\frac{C}{G}\log_\epsilon\left(\frac{EY\epsilon^{-x^2}}{E_{ref}}\right) \qquad (4)$$

Expanding Equation 4:

$$E_0=E_0'K\frac{C}{G}\left[\log_\epsilon E-x^2+\log_\epsilon\frac{Y}{E_{ref}}\right] \qquad (5)$$

In Equation 5, the parameters $E_0'$, K, C, Y and $E_{ref}$ are all constants. This equation may thus be simplified into the form:

$$E_0=V\frac{1}{G}\left[\log_\epsilon E-x^2\right]+UV\frac{1}{G} \qquad (6)$$

where $$V=E_0'KC$$

$$U=\log_\epsilon\frac{Y}{E_{ref}}$$

It will be apparent from Equation 6 that the output signal voltage $E_0$ varies as a logarithmic function of the applied signal voltage E and that the change of output signal voltage due to a change of frequency of the applied wave signal is a parabolic function.

The foregoing mathematical analysis of the operation of the superregenerative detector which includes the tube 12 applies in all respects to the operation of the detector which includes tube 12′, it being only necessary to bear it in mind that the frequency deviation $x$ of the two detectors occurs over different frequency ranges since the tuned circuits 10, 11 and 10′, 11′ are tuned to different frequencies. In the arrangement of Fig. 1, the same received wave signal is applied to both superregenerative detectors and the signal outputs are differentially combined. In the following analysis, it will be assumed that the detectors are simultaneously quenched, as by operation of the switch 22 to close its contacts 22b, 22b′. Thus, if the signal voltage $E_{01}$ represents the output of the superregenerative detector which includes tube 12 and the signal voltage $E_{02}$ represents that of the detector which includes the tube 12′, the differentially combined signal output of the detector system is given by the relation:

$$E_{01}-E_{02}=V_1\frac{1}{G_1}[\log_\epsilon E_1-x_1^2]-V_2\frac{1}{G_2}[\log_\epsilon E_2-x_2^2]+U_1V_1\frac{1}{G_1}-U_2V_2\frac{1}{G_2} \qquad (7)$$

where the subscript 1 denotes the superregenerative detector which includes tube 12 and the subscript 2 that which includes tube 12′. Now if the superregenerative detectors have circuit constants so selected and are so adjusted as to have a balanced operation, one with respect to the other, and if the amplitude of the wave-signal voltage applied to one of the detectors is the same as that applied to the other, then the following relationships prevail:

$$U_1=U_2=U \qquad (8)$$

$$V_1=V_2=V \qquad (9)$$

$$G_1=G_2=G \qquad (10)$$

$$E_1=E_2 \qquad (11)$$

and Equation 7 simplifies to the form:

$$E_{01}-E_{02}=V\frac{1}{G}[x_2^2-x_1^2] \qquad (12)$$

Figure 2B:
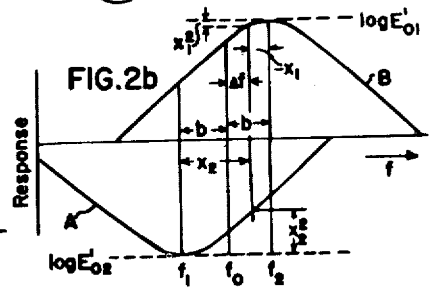

That the differentially combined output potential expressed by Equation 12 varies linearly with the frequency of the applied wave signal will be more evident from a consideration of Fig. 2b wherein curves A and B correspond to the same curves of Fig. 2. The frequency separations $f_2-f_0$ and $f_0-f_1$ are assumed equal and have the value $b$. For any incremental frequency deviation $\Delta f$ of the applied wave signal from the mean frequency $f_0$, the values of $x_1$ and $x_2$ of Equation 12 have the values:

$$-x_1=b-\Delta f \qquad (13)$$

$$x_2=b+\Delta f \qquad (14)$$

From Equations 12, 13, and 14, the differential output voltage of the two superregenerative detector systems has the value:

$$E_{01}-E_{02}=V\frac{1}{G}(b+\Delta f)^2-V\frac{1}{G}(b-\Delta f)^2 \qquad (15)$$

$$=4V\frac{1}{G}b\Delta f \qquad (16)$$

It can similarly be shown that for a frequency deviation $\Delta f$ of the applied wave signal greater than the frequency spacing $b$, the differential output voltage of the superregenerative detector systems also has a value given by Equation 16.

Thus, an angular-velocity-modulation receiver embodying the present invention derives an output signal the amplitude of which varies linearly with the frequency deviation of an applied frequency-modulated wave signal. This linearity is maintained over the entire range of frequency deviation of the latter if the range is such that the logarithmic mode of operation for the two detectors corresponds to the same logarithmic coefficient at the individual amplitudes of the applied wave signal (these amplitudes being determined by the individual response characteristics of the detector tuned circuits) and if both tuned circuits have probability-function responses over such range. It is possible to select a value of frequency separation between the resonant frequencies of the detector tuned circuits such that no appreciable distortion is produced by the detector even when the receiver is substantially detuned from the received wave signal, as may occur with a conventional frequency detector due to its S-shaped frequency-response characteristic. Instead, detuning of a receiver embodying the present invention may simply cause the derived modulation components of the signal to disappear into the noise level prevailing beyond each side of the frequency range $f_1-f_2$ of the detector.

This is shown more clearly by the curves of Figs. 2c and 2d where the frequency range $f_1-f_2$ is indicated as is the noise level prevailing beyond this frequency range on either side. Fig. 2c represents the conditions prevailing for a received wave signal of intensity stronger than the receiver noise level. For any deviations of this signal within the range $f_1-f_2$, the output signal of the detector is substantially free of noise as indicated. For a received wave signal having an intensity comparable to the noise level, a condition represented by Fig. 2d, some noise may be developed in the output circuit of the detector even though the frequency deviations of the wave signal remain within the frequency range $f_1-f_2$. It will consequently be apparent that, with the frequency deviation of the received wave signal occurring within the frequency range $f_1-f_2$ of the detector, the signal-to-noise ratio is approximately independent of the instantaneous frequency of the wave signal and depends only on the average intensity of the latter. No appreciable distortion of the derived modulation components may occur for frequency deviations of the received wave signal beyond the frequency range $f_1-f_2$, but the signal-to-noise ratio then begins to vary inversely with the deviation beyond such frequency range.

It will be apparent from Equations 7 and 12 that the wave-signal detector of the present invention is not responsive to amplitude variations of a received wave signal when the superregenerative detectors are simultaneously quenched as assumed in deriving these equations. This is true whether such variations are relatively slow, such as those caused by atmospheric fading, or whether they are in the nature of transient amplitude variations, such as caused by atmospheric and electrical disturbances, occurring during the sensitive periods of the regenerative circuits. This insensitivity of the detector to amplitude variations holds for any value of frequency deviation of a received wave signal. It may be stated that the detector is similarly insensitive to such amplitude variations where the regenerative circuits are alternately quenched, as by movement of a switch 22 to close its contacts 22a, 22a' if such amplitude variations are sufficiently slow compared to the period of two quench cycles of the voltage of source 20.

The preferred conductance characteristic graphically shown as curve D of Fig. 2a may be attained in a number of ways. For example, it may be attained by using a quench voltage originally of sinusoidal wave form but translated through a conventional limiting system to remove the peak-amplitude portions of each positive half cycle so that the amplitude of the voltage in the output circuit of the source 20 is constant during a desired interval of each positive half cycle. Alternatively, a voltage of linear saw-tooth or exponential saw-tooth wave form may similarly be translated through a conventional limiting system to remove the peak-amplitude portion of each positive half cycle, thereby to attain a quench voltage in the output circuit of source 20 having constant amplitude during a desired interval of each positive half cycle.

A suitable procedure by which it may be ascertained that each of the resonant circuits 10, 11 and 10', 11' has the desired probability-shaped frequency-response characteristics and that the associated regenerator circuit operates in the desired logarithmic mode will now be briefly described. Starting first with the regenerative circuit which includes the tube 12, a wave signal of constant frequency equal to the resonant frequency of the tuned circuit 10, 11 and of suitable amplitude is first applied to the regenerative circuit and the unidirectional output voltage developed by the diode detector 24 across its load impedance 25, 26 is noted. The applied wave signal is now varied in frequency over the range of response of the tuned circuit 10, 11, the amplitude of the wave signal being also varied as necessary to maintain constant the voltage developed across the diode load impedance 25, 26. These amplitude values of the applied wave signal are plotted to a logarithmic scale against the frequency of the wave signal plotted to a linear scale. This plot will be a parabolic curve if the resonant circuit 10, 11 has a probability-shaped frequency-response characteristic. The wave form of the quench voltage of the source 20 may be adjusted as necessary to attain the required rate of linear change of the conductance characteristic, which is the portion of the conductance characteristic during the interval $t_0-t_1$ of Fig. 2a, to effect attainment of the probability-shaped frequency-response characteristic of the tuned circuit 10, 11. The same procedure is used to adjust the regenerative circuit which includes the tube 12' except that the initial frequency of the applied wave signal corresponds to the resonant frequency of the resonant circuit 10', 11'.

The regenerative circuit which includes the tube 12 is then tested to ascertain that it has the desired logarithmic mode of operation over the required range of wave-signal amplitudes to be encountered in practice. This is accomplished by applying to the regenerative circuit a wave signal of constant frequency equal to the resonant frequency of the tuned circuit 10, 11 and by then varying the amplitude of the applied wave signal while maintaining its frequency constant. The applied wave-signal amplitudes plotted to a decibel or logarithmic scale against output voltage to a linear scale should be a linear curve if the regenerative circuit is operating in the logarithmic mode. The mode of operation of the regenerative circuit which includes the tube 12' is ascertained in similar manner except that the applied wave signal has a constant frequency equal to the resonant frequency of tuned circuit 10', 11'.

It will be apparent from the foregoing description of the Fig. 1 arrangement that the regenerative circuit which includes the resonant circuit 10, 11 and the tube 12 comprises a first wave-signal detector system having a wave-signal frequency-translation characteristic varying approximately in accordance with a predetermined probability function over a frequency range centered about a predetermined frequency, namely, the resonant frequency of the resonant circuit 10, 11, and having a wave-signal amplitude-translation characteristic varying approximately in accordance with a predetermined logarithmic function. Similarly, the regenerative circuit which includes the regenerative circuit 10', 11' and the tube 12' comprises a second wave-signal detector system having a wave signal frequency-translation characteristic varying approximately in accordance with a predetermined similar probability function over a frequency range approximately equal in width to the first range mentioned but centered about a second predetermined frequency, namely, the resonant frequency of the circuit 10', 11', so spaced from the first-mentioned predetermined frequency that the probability functions have substantial values at a third frequency, namely, the frequency $f_0$ as shown in Fig. 2, equally spaced from the first-mentioned and second-mentioned predetermined frequencies. This second detector system also has a wave-signal amplitude-translation characteristic varying approximately in accordance with the aforementioned predetermined logarithmic function. The units 19 and 19' comprise means for applying to both of the detector systems a frequency-modulated wave signal to derive for each thereof a detected output signal, and the differential connection of the diode load impedances 25, 26 and 25', 26' through the resistors 28 and 28' comprises means for differentially combining the detected output signals to derive a modulation signal having an amplitude varying approximately linearly with the frequency deviation of the applied wave signal from the mean frequency thereof and substantially independently of the intensity of the applied wave signal.

In Fig. 3 there is illustrated a receiver which operates on the same general principles as the receiver of Fig. 1, but which includes only a single tuned circuit. The receiver is shown in block form. Specifically, the receiver of Fig. 3 comprises a tuned circuit 30 and a first regenerator 31 coupled thereto to provide a superregenerative frequency-response characteristic which increases with frequency deviations in a given direction from a predetermined frequency in the operating range. In this respect tuned circuit 30 corresponds to tuned circuit 10, 11 of Fig. 1 and regenerator 31 corresponds to tube 12 and its associated circuit. The receiver of Fig. 3 also comprises a second regenerator for tuned circuit 30 having a superregenerative frequency-response characteristic which increases with frequency deviations in the opposite direction from the above-mentioned predetermined frequency in the operating range. Specifically, a second regenerator 31' is provided which is coupled to tuned circuit 30 and a reactance tube 32 is provided for varying the frequency of tuned circuit 30, thereby to give the type of response characteristic mentioned above.

Tuned circuit 30 is excited with the signal intercepted by antenna 18 and there is also provided means for alternately quenching the first regenerator 31 and the second regenerator 31' to provide regeneration. This last-named means comprises a pulse source 33 for supplying pulses to quench regenerators 31 and 31' alternately. A pulse from source 33 is also supplied to the reactance tube 32 to change the resonant frequency of tuned circuit 30 during periods when regenerator 31' is sensitive. A first detector 34 is coupled to tuned circuit 30 for detecting the superregenerative signals of regenerator 31 and a second detector 34' is similarly coupled to tuned circuit 30 for detecting superregenerative signals of the second regenerator 31'. The signal outputs of the detectors 34 and 34' are applied to the loudspeaker 27 with opposite polarities.

In order to cause the detectors 34 and 34' to be operative only during the required periods, control pulses are provided therefor by source 33. For this purpose, a control signal is provided for detector 34 through a delay means 35 and, similarly, a control signal is applied to detector 34' through a delay network 35'.

Reference is now made to the curves of Fig. 4 for a description of the operation of the receiver of Fig. 3. It will first be assumed that the source 33 develops a signal of the wave form illustrated by curve H of Fig. 4, as well as a square wave similar to curve I. For purposes of the present description, it will further be assumed that a linear mode of operation of the regenerative circuits is effected. For this purpose, each pulse of the voltage of source 33 has a pulse duration sufficiently short that the regenerators do not reach saturation during a quench cycle. The resonant frequency of tuned circuit 30 is controlled by the square-wave signal output of source 33 which is applied to reactance tube 32 to have substantially the frequency characteristic as illustrated in curve I. The positive components of pulse wave H of pulse source 33 are utilized to quench the second regenerator 31' and this quench voltage is represented by curve J. The negative components of pulse wave H of source 33 are derived and applied to regenerator 31 to quench that regenerator, the quench signals being reversed in polarity in unit 33 before application to provide a quench voltage for regenerator 31 of the wave form of curve K. Curves K, L, and M, individually represent the voltage of tuned circuit 30 under various operating conditions to be considered in more detail hereinafter. The curve P represents a delayed signal corresponding to the curve J as it is supplied to the second detector 34' through delay network 35' and the curve R represents a delayed signal corresponding to the curve K as it is supplied through delay network 35 to the detector 34. It will be assumed that frequencies $f_1$ and $f_2$ of curve I correspond to the similarly designated frequencies of the curve of Fig. 2 and, under these conditions, the operation of the circuit of Fig. 3 will be considered for a full operating cycle beginning at the time $t_a$. Due to the application of the square wave of source 33 to reactance tube 32, the resonant frequency of tuned circuit 30 is changed to $f_2$ at time $t_a$, as shown by curve I. The application of the first pulse of curve J to the second regenerator 31' makes this regenerator become operative at time $t_b$ and causes a transient signal dependent in amplitude upon the antenna excitation to build up across tuned circuit 30 during the time $t_b$–$t_c$, as illustrated in curve L. At time $t_c$ regenerator 31' is quenched and the voltage of tuned circuit 30 decreases, becoming equal to the excitation signal by time $t_d$. The resonant frequency of tuned circuit 30 is changed to $f_1$ at time $t_d$. At time $t_e$, as illustrated by curve K, regenerator 31 becomes sensitive and, during the time interval $t_e$–$t_f$ a transient voltage, dependent in amplitude upon the antenna excitation, is built up across tuned circuit 30 by the regenerator 31. If the two regenerators are identical and the signal intercepted by antenna 18 has a frequency $f_0$, the voltage thus built up across tuned circuit 30 by regenerator 31 is of the same amplitude and wave form as that previously built up due to the regenerative action of second regenerator 31′, as illustrated by curve L. At the time $t_f$ regenerator 31 is quenched and during the time interval $t_f$–$t_g$ the voltage of tuned circuit 30 dies down and the cycle repeats beginning at time $t_g$.

This described operation is based upon the premise that the frequency of the signal intercepted by antenna 18 is equally spaced from frequencies $f_1$ and $f_2$. Therefore, the voltage developed across tuned circuit 30 during the time interval $t_b$–$t_c$ is of the same amplitude and wave form as that developed across the tuned circuit during the interval $t_e$–$t_f$ even though the resonant frequency of the tuned circuit has a value $f_2$ during the period $t_a$–$t_d$ and $f_1$ during the period $t_d$–$t_g$ due to the action of reactance tube 32.

The curve M represents the condition when the signal intercepted has a frequency near $f_1$ and under these conditions the signal built up across tuned circuit 30 during the interval $t_b$–$t_c$ is appreciably less than the signal built up across the tuned circuit during the interval $t_e$–$t_f$ because, during the interval $t_a$–$t_d$, the circuit 30 has a resonant frequency $f_2$ considerably removed from the frequency of the intercepted signal and, during the interval $t_d$–$t_g$, the tuned circuit 30 has a resonant frequency $f_1$ very near the frequency of the intercepted signal. Similarly, curve N represents the response of the tuned circuit when the received signal has a frequency near the frequency $f_2$.

During the interval $t_h$–$t_k$ a pulse, represented in curve P, is applied through delay network 35′ to the second detector 34′ to cause this detector to become operative to detect signals occurring in the system during this interval. Similarly, during the time $t_m$–$t_n$, a pulse, as represented in curve R, is applied to first detector 34 from delay network 35 to cause detector 34 to become operative. The delay is provided for the detector circuits in order that the individual detectors may alternately become effective during periods when pulses of maximum amplitude occur across tuned circuit 30. The output signals from detectors 34 and 34′ are applied to loudspeaker 27 for reproduction in a manner generally similar to that described in detail in connection with Fig. 1.

In Fig. 5 there is illustrated a frequency-modulation superregenerative receiver generally similar to that of Fig. 3 which operates on the general principles outlined above. Circuit elements which are similar to those of the previous figures have identical reference numerals. The receiver of Fig. 5 thus includes a shunt-tuned circuit 30 comprising an inductance 10 and a capacitance 11. The regenerators 31 and 31′ are of the Hartley type, as in Fig. 1, and the tuned circuit 10, 11 is excited with signals intercepted by antenna 18 by means of an inductance 18′, coupled in circuit with antenna 18 and inductively coupled to inductance 10. Detectors 34 and 34′ are illustrated as of the triode type and have control electrodes coupled through coupling condensers 40 and 40′, respectively, to tuned circuit 10, 11 and load resistors 41 and 41′, respectively. The output circuits of detectors 34 and 34′ are coupled with opposite polarity to loudspeaker 27. Reactance tube 32 is of a conventional type and comprises a pentode having a capacitance 43 connected between its anode and control electrode, and square waves from source 33 are applied to the control electrode through a coupling condenser 44.

The operation of the circuit of Fig. 5 corresponds in all respects to that given above in connection with the circuit of Fig. 3 and this description will not be repeated. It is considered only necessary to state that detectors 34 and 34′ are caused to be operative only during predetermined periods by pulses from source 33, as represented by curves R and P, respectively, of Fig. 4. The square wave of source 33, which is applied to the control electrode of reactance tube 32, causes the frequency of tuned circuit 10, 11 to vary in accordance with the characteristic illustrated by curve I of Fig. 4.

While the quench voltage of the source 33 is shown by curve H of Fig. 4 as of pulse waveform, it will be apparent that it may if desired have a wave-form suitable to attain a conductance characteristic like curve D of Fig. 2d to effect a linear detector characteristic with logarithmic mode of operation as described above in connection with the arrangement of Fig. 1.

The arrangement of Fig. 6 comprises a superregenerative frequency-modulation receiver in accordance wtih the invention which includes a single tuned circuit, but in which a separate reactance tube is not required for varying the frequency of this tuned circuit, as in the Fig. 3 and Fig. 5 arrangements. Circuit elements of Fig. 6 which are identical to those of the preceding figures have the same reference numerals, and circuit elements which are generally similar to those of the preceding figures have the same reference numerals primed. Thus, the circuit of Fig. 6 comprises the single resonant circuit 10, 11 inductively coupled through winding 18′ to antenna 18. Two regenerators 31″ and 31‴ are coupled to tuned circuit 10 and 11, in a manner generally similar to that described above in connection with the other embodiments of the invention, and these regenerators are alternately quenched by a voltage from quench source 20 which is applied to the anodes of tubes 31″ and 31‴ with opposite polarity through a transformer 45. A condenser 46 is coupled between the anode of tube 31″ and ground, while a condenser 46″ is coupled between ground and one terminal of a resistor 47′ connected in the anode circuit of tube 31‴. Diode detectors 24″ and 24‴ are provided for the receiver of Fig. 6, being coupled with opposite polarity across tuned circuit 10, 11 through coupling condensers 48 and 48′, respectively. In order to cause the diode detectors 24″ and 24‴ to become operative only at predetermined periods during the operation of the receiver, a bias voltage is provided for these detectors by means of a winding 49 on transformer 45 which is included in a circuit between the common junction of the condensers 26 and 26′ and the common junction of inductors 50, 50′ connected in series between the cathode of tube 24″ and the anode of tube 24‴. Quench source 20 preferably provides a voltage of sine-wave form.

In considering the operation of the circuit of Fig. 6, it will be seen that it is generally similar to the operation of the circuits already described, the primary difference residing in the fact that resistor 47' in the anode circuit of tube 31''' produces feedback through the control electrode-to-anode capacitance of tube 31''', increasing the apparent input capacity of the tube, thus to shift the frequency of tuned circuit 10, 11. Accordingly, tube 31''' provides the function of the second regenerator of the Fig. 3 and Fig. 5 embodiments of the invention, as well as the function of reactance tube 32 of these embodiments. Quench source 20 also provides a switching bias for tubes 24'' and 24''' through winding 49 which is such that these tubes are caused to become alternately conductive for one-half of each quench cycle. By adjustment of the resonant-frequency condensers 46 and 46'' and the inductance of the tapped secondary winding of transformer 45 with respect to the frequency of the quench source, the appropriate delay or phase difference can be produced between the switching of diodes 24'' and 24''' and the quenching of regenerators 31'' and 31'''. It is, therefore, unnecessary in the embodiment of Fig. 6 to provide time-delay circuits comparable to those used in the Fig. 3 and Fig. 5 embodiments of the invention. It will thus be seen that there is an inherent advantage in providing a superregenerative frequency-modulation receiver of the general type under consideration which has a quench-voltage source of sine-wave form or of amplitude-limited sine-wave form. It will also be apparent to those skilled in the art that the circuits of Figs. 3 and 5 can be correspondingly modified and simplified by the use of a quench-voltage source of sine-wave form or of amplitude-limited sine-wave form.

It will also be understood that, in most cases, it will be found to be unnecessary to provide a limiter in the circuits of the invention to eliminate noise pulses of short duration for the reason that a receiver of the superregenerative type is inherently insensitive to most of such pulses. This is particularly true with the logarithmic mode of operation described.

It will be understood that, in most cases, an audio amplifier will be interposed before the loudspeaker.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A wave-signal receiver for receiving an angular-velocity-modulated wave signal having modulation components in a predetermined frequency range comprising, a tuned circuit, a regenerative circuit including said tuned circuit and having a superregenerative frequency-response characteristic which increases with frequency deviations in a given direction from a predetermined frequency in said range, a regenerative circuit including said tuned circuit and having a superregenerative frequency-response characteristic which increases with frequency deviations in the opposite direction from said predetermined frequency in said range, means for exciting said tuned circuit with said wave signal, means for quenching said regenerative circuits at substantially the same frequency one during alternate operating periods and the other during the intervening operating periods which periods have substantially equal durations, thereby to provide superregeneration, a pair of modulation-signal detectors individually coupled to said tuned circuit, means for controlling said detectors alternately and in synchronism with said operating periods to detect signal outputs from said regenerative circuits which are developed in said tuned circuit, and means for combining said detected signal outputs to develop the modulation components of said wave signal.

2. A wave-signal receiver for receiving an angular-velocity-modulated wave signal having modulation components in a predetermined frequency range comprising, a tuned circuit, a regenerative circuit including said tuned circuit and having a superregenerative frequency-response characteristic which increases with frequency deviations in a given direction from a predetermined frequency in said range, a regenerative circuit including said tuned circuit and having a superregenerative frequency-response characteristic which increases with frequency deviations in the opposite direction from said predetermined frequency in said range, means for exciting said tuned circuit with said wave signal, means for quenching said regenerative circuits at substantially the same frequency one during alternate operating periods and the other during the intervening operating periods which periods have substantially equal durations, thereby to provide superregeneration, a pair of oppositely poled diode detectors individually coupled to said tuned circuit, means for controlling said detectors alternately and in synchronism with said operating periods to detect signal outputs from said regenerative circuits which are developed in said tuned circuit, and means for differentially combining said signal outputs to develop the modulation components of said wave signal.

3. A wave-signal receiver for receiving an angular-velocity-modulated wave signal having modulation components in a predetermined frequency range comprising, a tuned circuit, a regenerative circuit including said tuned circuit and having a superregenerative frequency-response characteristic which increases with frequency deviations in a given direction from a predetermined frequency in said range, a regenerative circuit including said tuned circuit and having a superregenerative frequency-response characteristic which increases with frequency deviations in the opposite direction from said predetermined frequency in said range, means for exciting said tuned circuit with said wave signal, a source of quench oscillations of rectangular wave form, means for utilizing the oscillations of said source to quench said regenerative circuits one during alternate operating periods and the other during the intervening operating periods which periods have substantially equal durations, thereby to provide superregeneration, a pair of modulation-signal detectors individually coupled to said tuned circuit, means for utilizing the oscillations of said source to control said detectors alternately and in synchronism with said operating periods to detect signal outputs from said regenerative circuits which are developed in said tuned circuit, and means for combining said detected signal outputs to develop the modulation components of said wave signal.

4. A wave-signal receiver for receiving an angular-velocity-modulated wave signal having modulation components in a predetermined frequency range comprising, a tuned circuit, a regenerative circuit including said tuned circuit and having a superregenerative frequency-response characteristic which increases with frequency deviations in a given direction from a predetermined frequency in said range, a regenerative circuit including said tuned circuit and having a superregenerative frequency-response characteristic which increases with frequency deviations in the opposite direction from said predetermined frequency in said range, means for exciting said tuned circuit with said wave signal, a source of quench oscillations of symmetrical-pulse wave form having a pulse duration short in relation to the period of recurrence thereof, means for utilizing the oscillations of said source to quench said regenerative circuits one during alternate operating periods and the other during the intervening operating periods which periods have substantially equal durations, thereby to provide superregeneration, a pair of modulation-signal detectors individually coupled to said tuned circuit, means for utilizing the oscillations of said source to control said detectors alternately and in synchronism with said operating periods to detect signal outputs from said regenerative circuits which are developed in said tuned circuit, and means for combining said detected signal outputs to develop the modulation components of said wave signal.

5. A wave-signal receiver for receiving an angular-velocity-modulated wave signal having modulation components in a predetermined frequency range comprising, a tuned circuit, a regenerative circuit including said tuned circuit and having a superregenerative frequency-response characteristic which increases with frequency deviations in a given direction from a predetermined frequency in said range, a regenerative circuit including said tuned circuit and having a superregenerative frequency-response characteristic which increases with frequency deviations in the opposite direction from said predetermined frequency in said range, means for exciting said tuned circuit with said wave signal, means for quenching said regenerative circuits at substantially the same frequency and with substantially 180 degrees phase displacement to provide superregeneration, a pair of modulation-signal detectors individually coupled to said tuned circuit, means for controlling said detectors alternately and in synchronism with said quenching of said regenerative circuits by said quenching means to detect signal outputs from said regenerative circuits which are developed in said tuned circuit, and means for combining said detected signal outputs to develop the modulation components of said wave signal.

6. A wave-signal receiver for receiving an angular-velocity-modulated wave signal having modulation components in a predetermined frequency range comprising, a tuned circuit, a regenerative circuit including said tuned circuit and having a superregenerative frequency-response characteristic which increases with frequency deviations in a given direction from a predetermined frequency in said range, a regenerative circuit including said tuned circuit and having a superregenerative frequency-response characteristic which increases with frequency deviations in the opposite direction from said predetermined frequency in said range, means for exciting said tuned circuit with said wave signal, a source of quench oscillations of symmetrical-pulse wave form having a pulse duration short in relation to the period of recurrence thereof, means for utilizing the oscillations of said source to quench said regenerative circuits at substantially the same frequency one during alternate operating periods and the other during the intervening operating periods which periods have substantially equal durations, thereby to provide superregeneration, a pair of modulation-signal detectors individually coupled to said tuned circuit, means for delaying the oscillations of said source by a time interval approximately equal to one-half the pulse duration thereof and for utilizing the delayed oscillations to control said detectors alternately and in synchronism with said operating periods to detect signal outputs from said regenerative circuits which are developed in said tuned circuit, and means for combining signal outputs from said detectors to develop the modulation components of said wave signal.

7. A wave-signal receiver for receiving an angular-velocity-modulated wave signal having modulation components on a predetermined frequency range comprising, a tuned circuit, a regenerative circuit including said tuned circuit and having a superregenerative frequency-response characteristic which increases with frequency deviations in a given direction from a predetermined frequency in said range, a regenerative circuit including said tuned circuit and having a superregenerative frequency-response characteristic which increases with frequency deviations in the opposite direction from said predetermined frequency in said range, means for exciting said tuned circuit with said wave signal, means for quenching said regenerative circuits at substantially the same frequency but at a frequency higher than the frequency of any of the modulation components of said wave signal, one of said circuits being quenched during alternate operating periods and the other during the intervening operating periods which periods have substantially equal durations, thereby to provide superregeneration, a pair of modulation-signal detectors individually coupled to said tuned circuit, means for controlling said detectors alternately and in synchronism with said operating periods to detect signal outputs from said regenerative circuits which are developed in said tuned circuit, and means for combining said detected signal outputs to develop the modulation components of said wave signal.

8. A wave-signal receiver for receiving an angular-velocity-modulated wave signal having modulation components in a predetermined frequency range comprising, a tuned circuit, a regenerative circuit including said tuned circuit and having a superregenerative frequency-response characteristic which increases with frequency deviations in a given direction from a predetermined frequency in said range, a regenerative circuit including said tuned circuit and a reactance tube, said last-named regenerative circuit having a superregenerative frequency-response characteristic which increases with frequency deviations in the opposite direction from said predetermined frequency in said range, means for exciting said tuned circuit with said wave signal, means for quenching said regenerative circuits one during alternate operating periods and the other during the intervening operating periods which periods have substantially equal durations, thereby to provide superregeneration, a pair of modulation-signal detectors individually coupled to said tuned circuit, means for controlling said detectors alternately and in synchronism with said operating periods to detect signal outputs from said regenerative circuits which are developed in said tuned circuit, and means for combining said detected signal outputs to develop the modulation components of said wave signal.

9. A wave-signal receiver for receiving an angular-velocity-modulated wave signal having modulation components in a predetermined frequency range comprising, a tuned circuit, a regenerative circuit including said tuned circuit and having a superregenerative frequency-response characteristic which increases with frequency deviations in a given direction from a predetermined frequency in said range, a regenerative circuit including said tuned circuit and having a superregenerative frequency-response characteristic which increases with frequency deviations in the opposite direction from said predetermined frequency in said range, means for exciting said tuned circuit with said wave signal, means for quenching first one of said regenerative circuits and then the other of said regenerative circuits with a substantial time delay between quench periods to provide superregeneration, a pair of modulation-signal detectors individually coupled to said regenerative circuits, means for controlling said detectors alternately to detect signal outputs from said regenerative circuits in synchronism with the quenching of said regenerative circuits by said quenching means, and means for combining said detected signal outputs to develop the modulation components of said wave signal.

10. A wave-signal receiver for receiving an angular-velocity-modulated wave signal having modulation components in a predetermined frequency range comprising, a tuned circuit, a regenerative circuit including said tuned circuit and having a superregenerative frequency-response characteristic which increases with frequency deviations in a given direction from a predetermined frequency in said range, a regenerative circuit including said tuned circuit and having a superregenerative frequency-response characteristic which increases with frequency deviations in the opposite direction from said predetermined frequency in said range, means for exciting said tuned circuit with said wave signal, means for alternately quenching said regenerative circuits to provide superregeneration, two detectors coupled to said tuned circuit, means for alternately biasing said detectors to operativeness during periods having delays approximately equal to one-half the durations thereof with reference to the times corresponding ones of said regenerative circuits are permitted by said quench means to initiate a cycle of superregenerative action, and means for combining signal outputs from said detectors to develop the modulation components of said wave signal.

11. A wave-signal receiver for receiving an angular-velocity-modulated wave signal having modulation components in a predetermined frequency range comprising, a tuned circuit, first and second regenerative circuits each including said tuned circuit, means for causing at least one of said regenerative circuits in its oscillatory state to present to said tuned circuit a dynamic capacitive reactance of a value different from that presented by the other of said regenerative circuits in its oscillatory state, thereby so to shift the resonant frequency of said tuned circuit in response to the oscillatory state of said one regenerative circuit that said regenerative circuits have superregenerative frequency-response characteristics which vary in opposite senses with frequency from a predetermined frequency in said range, means for exciting said tuned circuit with said wave signal, means for quenching said regenerative circuits one during alternate operating periods and the other during the intervening operating periods which periods have substantially equal durations, thereby to provide superregeneration, a pair of modulation-signal detectors individually coupled to said regenerative circuits, means for controlling said detectors alternately to detect signal outputs from said regenerative circuits in synchronism with said operating periods thereof, and means for combining said detected signal outputs to develop the modulation components of said wave signal.

12. A wave-signal receiver for receiving an angular-velocity-modulated wave signal having modulation components in a predetermined frequency range comprising, a tuned circuit, two vacuum tubes having input circuits coupled in parallel to said tuned circuit and output circuits coupled in push-pull, a first regenerative circuit including said tuned circuit and one of said tubes, said first regenerative circuit having a superregenerative frequency-response characteristic which increases with frequency deviations in a given direction from a predetermined frequency in said range, a second regenerative circuit including said tuned circuit and the other of said tubes, said second regenerative circuit having a superregenerative frequency-response characteristic which increases with frequency deviations in the opposite direction from said predetermined frequency in said range, means for exciting said tuned circuit with said wave signal, a source of quench voltages, means for applying voltages of opposite polarities from said quench source to said output circuits to quench said regenerative circuits one during alternate operating periods and the other during the intervening operating periods which periods have substantially equal durations, thereby to provide superregeneration, a pair of modulation-signal detectors individually coupled to said regenerative circuits, means for controlling said detectors alternately to detect signal outputs from said regenerative circuits in synchronism with said operating periods thereof, and means for combining said detected signal outputs to develop the modulation components of said wave signal.

13. A wave-signal receiver for receiving an angular-velocity-modulated wave signal having modulation components in a predetermined frequency range comprising, a tuned circuit, two vacuum tubes having input circuits coupled in parallel to said tuned circuit and output circuits coupled in push-pull, a first regenerative circuit including said tuned circuit and one of said tubes, said first regenerative circuit having a superregenerative frequency-response characteristic which increases with frequency deviations in a given direction from a predetermined frequency in said range, a second regenerative circuit including said tuned circuit and the other of said tubes, said second regenerative circuit having a superregenerative frequency-response characteristic which increases with frequency deviations in the opposite direction from said predetermined frequency in said range, means for exciting said tuned circuit with said wave signal, a sine-wave quench source, means for applying voltages of opposite polarities from said quench source to said output circuits to quench said regenerative circuits to provide superregeneration, two oppositely poled diode rectifiers coupled across said tuned circuit and having individual load circuits, means for applying a voltage from said quench source in series with each of said load circuits and its corresponding diode, and means for deriving an output signal representing the modulation components of said wave signal from the load circuits of said diodes.

14. A wave-signal receiver for receiving an angular-velocity-modulated wave signal having modulation components in a predetermined frequency range comprising, a tuned circuit, two vacuum tubes having input circuits coupled in parallel to said tuned circuit and output circuits coupled in push-pull, a first regenerative circuit including said tuned circuit and one of said tubes, said first regenerative circuit having a superregenerative frequency-response characteristic which increases with frequency deviations in a given direction from a predetermined frequency in said range, a second regenerative circuit including said tuned circuit and the other of said tubes, said second regenerative circuit having a resistor in series with its anode circuit to provide a superregenerative frequency-response characteristic which increases with frequency deviations in the opposite direction from said predetermined frequency in said range, means for exciting said tuned circuit with said wave signal, means for quenching said regenerative circuits one during alternate operating periods and the other during the intervening operating periods which periods have substantially equal durations, thereby to provide superregeneration, and means for combining signal outputs from said regenerative circuits to develop the modulation components of said wave signal.

15. A wave-signal receiver for receiving an angular-velocity-modulated wave signal having modulation components in a predetermined frequency range comprising, a tuned circuit, first and second regenerative circuits each including said tuned circuit, means for causing at least one of said regenerative circuits in its oscillatory state to apply a feed-back output voltage to said tuned circuit having a quadrature-phase relation to the voltage induced in said tuned circuit by a wave signal applied thereto effectively to change the resonant frequency of said tuned circuit during the oscillatory state of said one regenerative circuit, thereby so to shift the resonant frequency of said tuned circuit in response to the oscillatory state of said one regenerative circuit that said regenerative circuits have superregenerative frequency-response characteristics which vary in opposite senses with frequency from a predetermined frequency in said range, means for exciting said tuned circuit with said wave signal, means for quenching said regenerative circuits one during alternate operating periods and the other during the intervening operating periods which periods have substantially equal durations, thereby to provide superregeneration, a pair of modulation-signal detectors individually coupled to said regenerative circuits, means for controlling said detectors alternately to detect signal outputs from said regenerative circuits in synchronism with said operating periods thereof, and means for combining said detected signal outputs to develop the modulation components of said wave signal.

BERNARD D. LOUGHLIN.

REFERENCES CITED

The following references are of record in the file of this patent:

UNITED STATES PATENTS

| Number | Name | Date |
|---|---|---|
| 2,265,826 | Wheeler | Dec. 9, 1941 |
| 2,273,090 | Crosby | Feb. 17, 1942 |
| 2,351,193 | Crosby | June 13, 1944 |
| 2,363,651 | Crosby | Nov. 28, 1944 |
| 2,416,794 | Crosby | Mar. 4, 1947 |

OTHER REFERENCES

Kalmus: Some Notes on Superregeneration. Proc. I. R. E., vol. 32, No. 10, October 1944, pages 591 to 600.

Frink: Basic Principles of Superregenerative Reception. Proc. I. R. E., vol. 26, No. 1, January 1938.

Certificate of Correction

Patent No. 2,577,781 December 11, 1951

BERNARD D. LOUGHLIN

It is hereby certified that error appears in the printed specification of the above numbered patent requiring correction as follows:

Column 2, line 55, for "hereto" read *heretofore*; column 3, lines 53 and 54, strike out "operaton" and insert instead *operation*; line 75, for "features" read *feature*; column 4, line 23, for "somprises" read *comprises*; column 8, line 16, for "comprise" read *compromise*; column 9, line 30, for "$F(f)=Y\epsilon^{-x}$" read $F(f)=Y\epsilon^{-x^2}$; column 16, line 33, for "wtih" read *with*;

and that the said Letters Patent should be read as corrected above, so that the same may conform to the record of the case in the Patent Office.

Signed and sealed this 11th day of March, A. D. 1952.

[SEAL]

THOMAS F. MURPHY,
*Assistant Commissioner of Patents.* pled across said tuned circuit and having individual load circuits, means for applying a voltage from said quench source in series with each of said load circuits and its corresponding diode, and means for deriving an output signal representing the modulation components of said wave signal from the load circuits of said diodes.

14. A wave-signal receiver for receiving an angular-velocity-modulated wave signal having modulation components in a predetermined frequency range comprising, a tuned circuit, two vacuum tubes having input circuits coupled in parallel to said tuned circuit and output circuits coupled in push-pull, a first regenerative circuit including said tuned circuit and one of said tubes, said first regenerative circuit having a superregenerative frequency-response characteristic which increases with frequency deviations in a given direction from a predetermined frequency in said range, a second regenerative circuit including said tuned circuit and the other of said tubes, said second regenerative circuit having a resistor in series with its anode circuit to provide a superregenerative frequency-response characteristic which increases with frequency deviations in the opposite direction from said predetermined frequency in said range, means for exciting said tuned circuit with said wave signal, means for quenching said regenerative circuits one during alternate operating periods and the other during the intervening operating periods which periods have substantially equal durations, thereby to provide superregeneration, and means for combining signal outputs from said regenerative circuits to develop the modulation components of said wave signal.

15. A wave-signal receiver for receiving an angular-velocity-modulated wave signal having modulation components in a predetermined frequency range comprising, a tuned circuit, first and second regenerative circuits each including said tuned circuit, means for causing at least one of said regenerative circuits in its oscillatory state to apply a feed-back output voltage to said tuned circuit having a quadrature-phase relation to the voltage induced in said tuned circuit by a wave signal applied thereto effectively to change the resonant frequency of said tuned circuit during the oscillatory state of said one regenerative circuit, thereby so to shift the resonant frequency of said tuned circuit in response to the oscillatory state of said one regenerative circuit that said regenerative circuits have superregenerative frequency-response characteristics which vary in opposite senses with frequency from a predetermined frequency in said range, means for exciting said tuned circuit with said wave signal, means for quenching said regenerative circuits one during alternate operating periods and the other during the intervening operating periods which periods have substantially equal durations, thereby to provide superregeneration, a pair of modulation-signal detectors individually coupled to said regenerative circuits, means for controlling said detectors alternately to detect signal outputs from said regenerative circuits in synchronism with said operating periods thereof, and means for combining said detected signal outputs to develop the modulation components of said wave signal.

BERNARD D. LOUGHLIN.

REFERENCES CITED

The following references are of record in the file of this patent:

UNITED STATES PATENTS

| Number | Name | Date |
|---|---|---|
| 2,265,826 | Wheeler | Dec. 9, 1941 |
| 2,273,090 | Crosby | Feb. 17, 1942 |
| 2,351,193 | Crosby | June 13, 1944 |
| 2,363,651 | Crosby | Nov. 28, 1944 |
| 2,416,794 | Crosby | Mar. 4, 1947 |

OTHER REFERENCES

Kalmus: Some Notes on Superregeneration. Proc. I. R. E., vol. 32, No. 10, October 1944, pages 591 to 600.

Frink: Basic Principles of Superregenerative Reception. Proc. I. R. E., vol. 26, No. 1, January 1938.

Certificate of Correction

Patent No. 2,577,781 December 11, 1951

BERNARD D. LOUGHLIN

It is hereby certified that error appears in the printed specification of the above numbered patent requiring correction as follows:

Column 2, line 55, for "hereto" read *heretofore*; column 3, lines 53 and 54, strike out "operaton" and insert instead *operation*; line 75, for "features" read *feature*; column 4, line 23, for "somprises" read *comprises*; column 8, line 16, for "comprise" read *compromise*; column 9, line 30, for "$F(f)=Y\epsilon^{-x}$" read $F(f)=Y\epsilon^{-x^2}$; column 16, line 33, for "wtih" read *with*;

and that the said Letters Patent should be read as corrected above, so that the same may conform to the record of the case in the Patent Office.

Signed and sealed this 11th day of March, A. D. 1952.

[SEAL]

THOMAS F. MURPHY,
*Assistant Commissioner of Patents.*

Certificate of Correction

Patent No. 2,577,781

December 11, 1951

BERNARD D. LOUGHLIN

It is hereby certified that error appears in the printed specification of the above numbered patent requiring correction as follows:

Column 2, line 55, for "hereto" read *heretofore*; column 3, lines 53 and 54, strike out "operaton" and insert instead *operation*; line 75, for "features" read *feature*; column 4, line 23, for "somprises" read *comprises*; column 8, line 16, for "comprise" read *compromise*; column 9, line 30, for "$F(f)=Y\epsilon^{-x}$" read $F(f)=Y\epsilon^{-x^2}$; column 16, line 33, for "wtih" read *with*;

and that the said Letters Patent should be read as corrected above, so that the same may conform to the record of the case in the Patent Office.

Signed and sealed this 11th day of March, A. D. 1952.

[SEAL]

THOMAS F. MURPHY,
*Assistant Commissioner of Patents.*